(12) United States Patent
Strauss

(10) Patent No.: US 7,699,128 B1
(45) Date of Patent: Apr. 20, 2010

(54) ELECTRIC VEHICLE

(76) Inventor: Lydia J. Strauss, 534 Lake No No Rd., Midway, GA (US) 31320

( * ) Notice: Subject to any disclaimer, the term of this patent is extended or adjusted under 35 U.S.C. 154(b) by 304 days.

(21) Appl. No.: 11/799,841

(22) Filed: May 3, 2007

(51) Int. Cl.
*B60K 1/00* (2006.01)
(52) U.S. Cl. .................. 180/65.1; 180/253; 180/23
(58) Field of Classification Search ............ 280/47.315, 280/47.371, 655, 655.1; 446/25, 93, 94, 446/95, 96, 189, 237, 238, 239, 246, 240, 446/247, 248; 180/907, 908
See application file for complete search history.

(56) References Cited

U.S. PATENT DOCUMENTS

| | | | |
|---|---|---|---|
| 3,575,250 A | 4/1971 | Dykes | |
| 4,096,920 A | 6/1978 | Heyn | |
| 4,570,739 A * | 2/1986 | Kramer | 180/216 |
| 4,683,973 A * | 8/1987 | Honjo et al. | 180/252 |
| 4,771,840 A * | 9/1988 | Keller | 180/11 |
| D309,517 S | 7/1990 | Hawkins | |
| 5,064,012 A | 11/1991 | Losego | |
| 5,288,001 A * | 2/1994 | Locarno | 224/407 |
| 5,899,285 A | 5/1999 | Curbelo | |
| 6,299,207 B1 * | 10/2001 | Bares | 280/748 |
| 6,443,252 B1 | 9/2002 | Andes | |
| 6,572,122 B2 * | 6/2003 | Johnson et al. | 280/33.993 |
| 6,902,024 B2 * | 6/2005 | Miiller et al. | 180/271 |
| 2003/0218312 A1 * | 11/2003 | Forshee et al. | 280/304.1 |
| 2005/0061560 A1 * | 3/2005 | Philipson | 180/65.1 |
| 2005/0087954 A1 * | 4/2005 | Wakita et al. | 280/304.1 |

\* cited by examiner

*Primary Examiner*—Glenn Dayoan
*Assistant Examiner*—Erez Gurari

(57) ABSTRACT

Electric vehicles provide shoppers with a motorized shopping cart that can be moved and steered via a hand controller. A base has four castor type wheels, a rechargeable battery, a control box housing a CPU, a right angle motor, and a large turning gear attached to its underside. A small turning gear connects the right angle motor to the large turning gear. A drive motor, drive belt, drive shaft, and drive wheels are mounted on the large turning gear. Front rails and clips are attached to the front of the base. A rear support with an oxygen tank holder is attached to the rear of the top of the base. Telescoping side rails connect the front rails to rear rails with latches attached to the rear support. A joystick-type controller is suspended between the front rails. A pressure sensor is attached to the base's top.

1 Claim, 4 Drawing Sheets

ELECTRIC VEHICLE

BACKGROUND OF THE INVENTION

1. Field of the Invention

The present invention relates to an electric vehicle for use in connection with transportation. The electric vehicle has particular utility in connection with providing shoppers with a motorized shopping cart that can be moved and steered via a hand controller.

2. Description of the Prior Art

Electric vehicles are desirable for providing shoppers with a motorized shopping cart that can be moved and steered via a hand controller. A variety of motorized shopping carts is known, but these have numerous disadvantages. Many do not allow for a rider and/or have small carrying capacities. Some require the user to repeatedly rise from the seated position to add items to the cart. Others lack important safety features, such as safety rails to secure a rider and measures to prevent children from operating the motorized cart.

The use of motorized personal shopping carts is known in the prior art. For example, U.S. Pat. No. 5,899,285 to Curbelo discloses a motorized personal shopping cart. However, the Curbelo '285 patent does not provide a base for the shopper to ride, and has further drawbacks of using multiple control knobs instead of a single joystick controller.

U.S. Pat. No. 4,771,840 to Keller discloses an articulated power-driven shopping cart that is provided for the handicapped. However, the Keller '840 patent does not have a pressure sensor, and additionally does not allow the user to add items to the shopping cart without having to rise from the seated position.

Similarly, U.S. Pat. No. 4,096,920 to Heyn discloses a powered shopping cart and trailer that transports a passenger behind the cart. However, the Heyn '920 patent does not have a safety railing enclosure, and cannot prevent a child from activating the controls.

In addition, U.S. Pat. No. 3,575,250 to Dykes discloses a self-propelled electric vehicle and battery mount that drivingly connects the vehicle to a variety of wheeled devices. However, the Dykes '250 patent does not have a joystick controller, and also does not have a pressure sensor.

Furthermore, U.S. Pat. No. 6,443,252 to Andes discloses a passenger standing platform on a powered wheelchair that transports a standing rider. However, the Andes '252 patent does not have a motor attached to the base, and further lacks drive wheels attached to the base.

U.S. Pat. No. 5,064,012 to Losego discloses a system for motorizing a shopping cart or trolly, or the like that motorizes a shopping cart or the like. However, the Losego '012 patent does not transport a rider, and has the additional deficiency of lacking a base.

Lastly, U.S. Pat. No. D309,517 to Hawkins discloses a motorized carrying cart that is an ornamental design for a motorized carrying cart. However, the Hawkins '517 patent does not transport a rider, and also does not have a right angle motor.

While the above-described devices fulfill their respective, particular objectives and requirements, the aforementioned patents do not describe an electric vehicle that allows providing shoppers with a motorized shopping cart that can be moved and steered via a hand controller.

Therefore, a need exists for a new and improved electric vehicle that can be used for providing shoppers with a motorized shopping cart that can be moved and steered via a hand controller. In this regard, the present invention substantially fulfills this need. In this respect, the electric vehicle according to the present invention substantially departs from the conventional concepts and designs of the prior art, and in doing so provides an apparatus primarily developed for the purpose of providing shoppers with a motorized shopping cart that can be moved and steered via a hand controller.

SUMMARY OF THE INVENTION

In view of the foregoing disadvantages inherent in the known types of motorized personal shopping carts now present in the prior art, the present invention provides an improved electric vehicle, and overcomes the above-mentioned disadvantages and drawbacks of the prior art. As such, the general purpose of the present invention, which will be described subsequently in greater detail, is to provide a new and improved electric vehicle which has all the advantages of the prior art mentioned heretofore and many novel features that result in an electric vehicle which is not anticipated, rendered obvious, suggested, or even implied by the prior art, either alone or in any combination thereof.

To attain this, the present invention essentially comprises a base with a plurality of wheels attached to the front and rear of its bottom. A power source and a control box are attached to the rear of the bottom of the base. The control box encloses a CPU. A right angle motor is attached to the middle of the bottom of the base. A small turning gear is connected to the right angle motor. A large turning gear is frictionally engaged with the small turning gear. A drive motor is attached to the large turning gear. A drive shaft is attached to the large turning gear by a plurality of brackets. A drive belt connects the drive motor to the middle of the driveshaft. A plurality of drive wheels are connected to the opposing ends of the driveshaft. A controller is connected to the control box.

There has thus been outlined, rather broadly, the more important features of the invention in order that the detailed description thereof that follows may be better understood and in order that the present contribution to the art may be better appreciated.

The invention may also include a plurality of clips attached to the base's front. There may be a pressure sensor attached to the base's top. There may be a plurality of front rails with one end attached to the front of the base, a plurality of side rails with one of the opposing ends telescopically protruding from the front rails, a plurality of rear rails with one end releasably receiving the opposing ends of the side rails opposite the front rails, and a rear support with one end attached to the top of the rear of the base and its opposing end attached to one of the opposing ends of the rear rails opposite the side rails. There may be an oxygen tank holder attached to the middle of the rear support. There may be a plurality of latches with each of the opposing ends of the rear rails opposite the rear support having a latch attached thereto. The CPU may disable the controller when the side rails are not releasably received by the rear rails and the latches are not secured. The CPU may disable the controller when the pressure sensor does not measure a weight on the top of the base exceeding a preset minimum. The wheels may be of the castor type. The controller may be of the joystick type. The power source may be selected from the group consisting of batteries, rechargeable batteries, fuel cells, solar cells, and internal combustion engines. The invention may be an improvement to a shopping cart. The plurality of clips may be removably connected to the rear legs of a shopping cart. The controller may be suspended between the front rails. There are, of course, additional features of the invention that will be described hereinafter and which will form the subject matter of the claims attached.

Numerous objects, features, and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electric vehicle that has all of the advantages of the prior art motorized personal shopping carts and none of the disadvantages.

It is another object of the present invention to provide a new and improved electric vehicle that may be easily and efficiently manufactured and marketed.

An even further object of the present invention is to provide a new and improved electric vehicle that has a low cost of manufacture with regard to both materials and labor, and which accordingly is then susceptible of low prices of sale to the consuming public, thereby making such electric vehicle economically available to the buying public.

Still another object of the present invention is to provide a new electric vehicle that provides in the apparatuses and methods of the prior art some of the advantages thereof, while simultaneously overcoming some of the disadvantages normally associated therewith.

Even still another object of the present invention is to provide an electric vehicle for providing shoppers with a motorized shopping cart that can be moved and steered via a hand controller. This allows the user to move a shopping cart without exerting him or herself.

Still yet another object of the present invention is to provide an electric vehicle for providing shoppers with a motorized shopping cart that can be moved and steered via a hand controller. This makes it possible to prevent a child from activating the controller.

An additional object of the present invention is to provide an electric vehicle for providing shoppers with a motorized shopping cart that can be moved and steered via a hand controller. This enables a shopping cart to be attached and detached from the electric vehicle.

A further object of the present invention is to provide an electric vehicle for providing shoppers with a motorized shopping cart that can be moved and steered via a hand controller. This enables the user to ride the electric vehicle in a standing position.

Lastly, it is an object of the present invention to provide a new and improved electric vehicle for providing shoppers with a motorized shopping cart that can be moved and steered via a hand controller.

These together with other objects of the invention, along with the various features of novelty that characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE CURRENT EMBODIMENT

Figure 1:
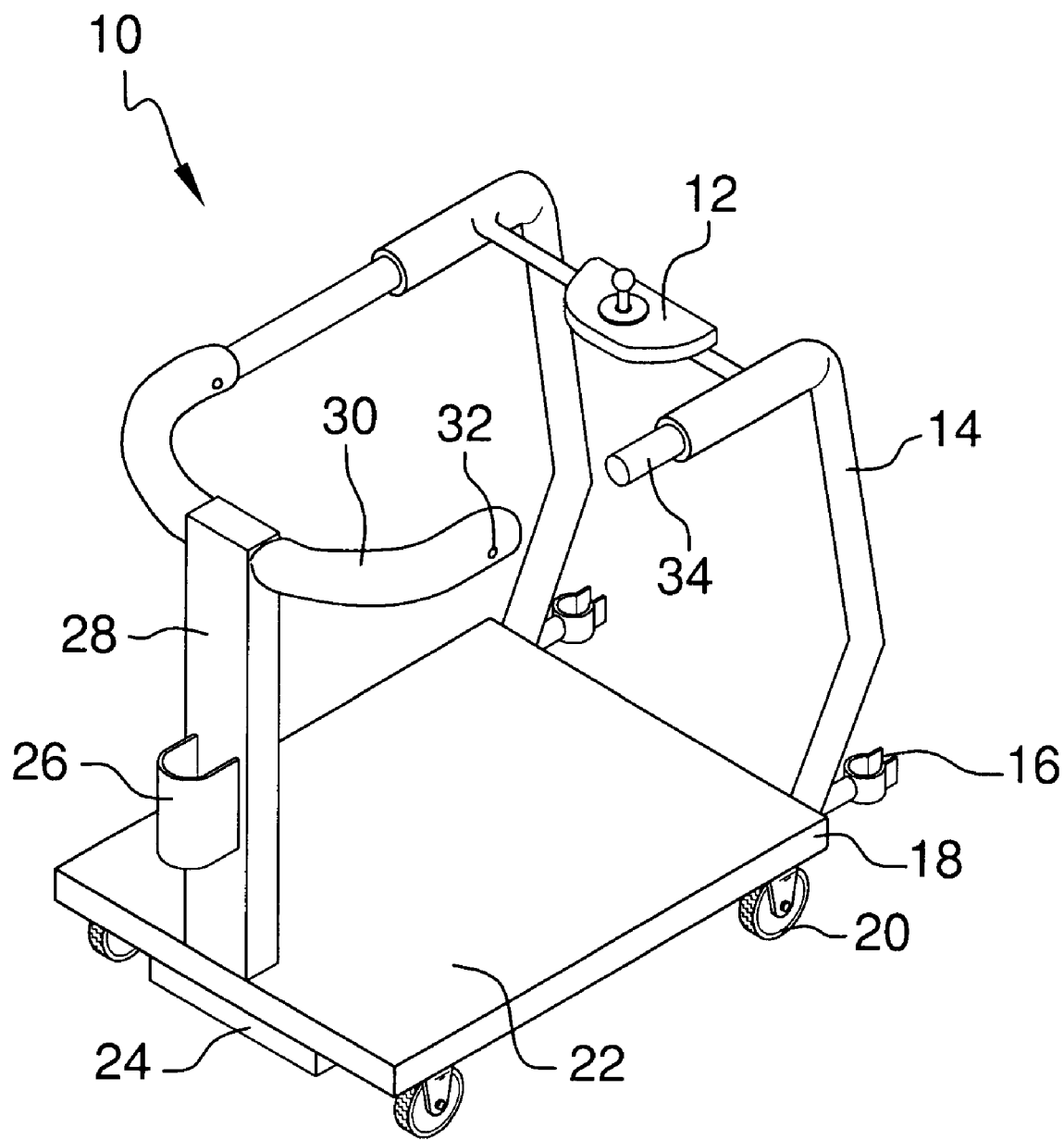
FIG. 1 is a top perspective view of the current embodiment of the electric vehicle constructed in accordance with the principles of the present invention.

Referring now to the drawings, and particularly to FIGS. 1-6, a current embodiment of the electric vehicle of the present invention is shown and generally designated by the reference numeral 10.

In FIG. 1, a new and improved electric vehicle 10 of the present invention for providing shoppers with a motorized shopping cart that can be moved and steered via a hand controller is illustrated and will be described. More particularly, the electric vehicle 10 has a base 18 with wheels 20 attached to its underside at its corners. Rear support 28 is attached to the rear of the top of base 18. Extending forward from the top of rear support 18 are two rear rails 30. Oxygen tank holder 26 is attached to rear support 28's middle. Two front rails 14 protrude outwardly and upwardly from the front of base 18. Controller 22 is suspended between front rails 14, and side rails 34 protrude telescopically from front rails 14. When fully extended, side rails 34 are received by rear rails 30, and latches 32 releasably secure side rails 34 within rear rails 30. Clips 16 protrude forwardly from the front of base 18. Pressure sensor 22 is attached to the top of base 18. Pressure sensor 22 detects the weight of the user. In the current embodiment, wheels 20 are of the castor type, controller 12 is of the joystick type, and battery 24 is rechargeable.

Figure 2:
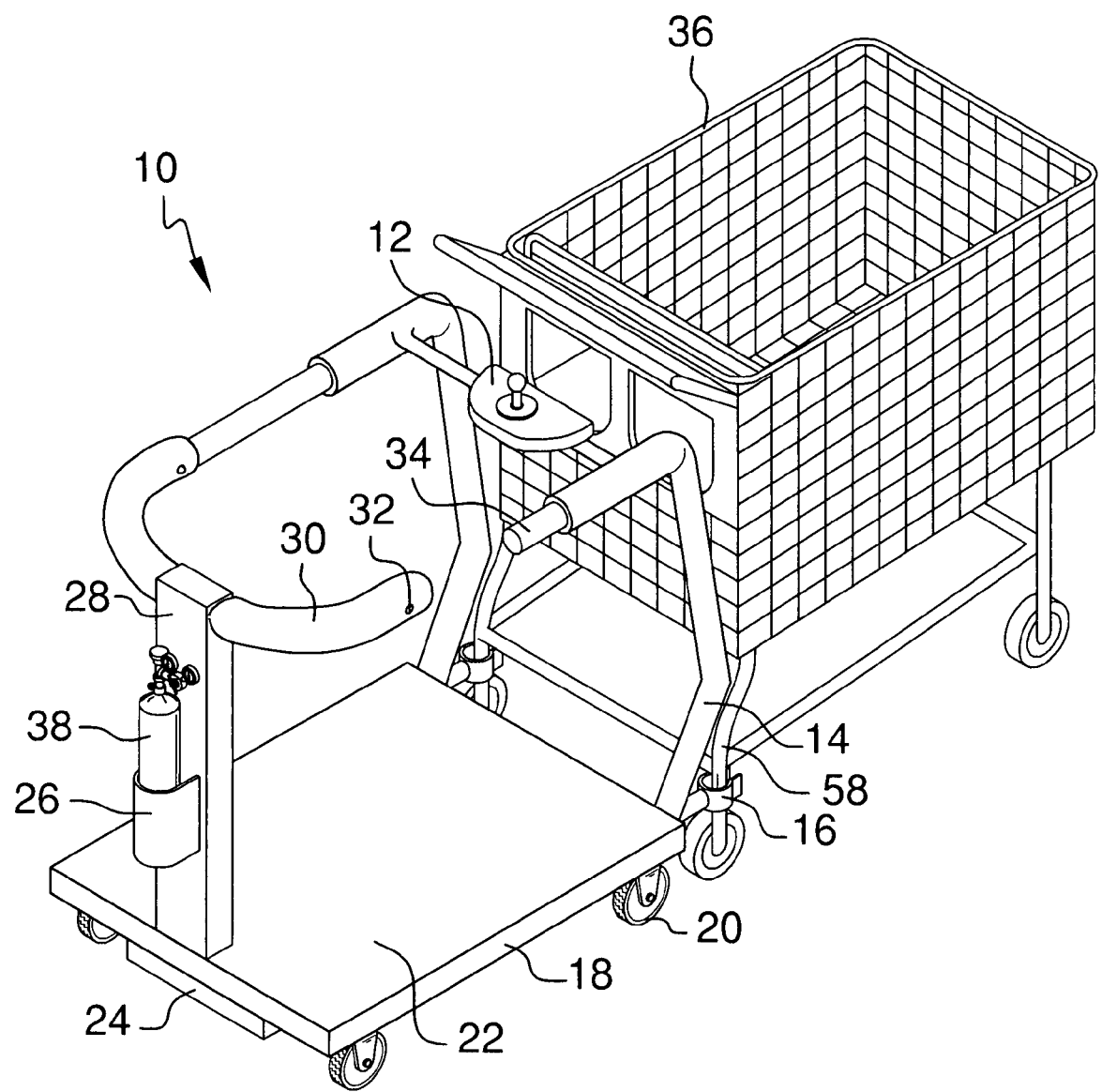
FIG. 2 is a top perspective view of the electric vehicle of the present invention.

Moving on to FIG. 2, a new and improved electric vehicle 10 of the present invention for providing shoppers with a motorized shopping cart that can be moved and steered via a hand controller is illustrated and will be described. More particularly, the electric vehicle 10 is shown with shopping cart 36 removably attached to it. This is accomplished by inserting rear legs 58 of shopping card 36 into clips 16. Oxygen tank 38 is placed within oxygen tank holder 26 to releasably secure it. By manipulating controller 12, the user can move shopping cart 36 in the desired direction. Note that shopping cart 36 and oxygen tank 38 are for illustrative purposes only and are not part of the current invention.

Figure 3:
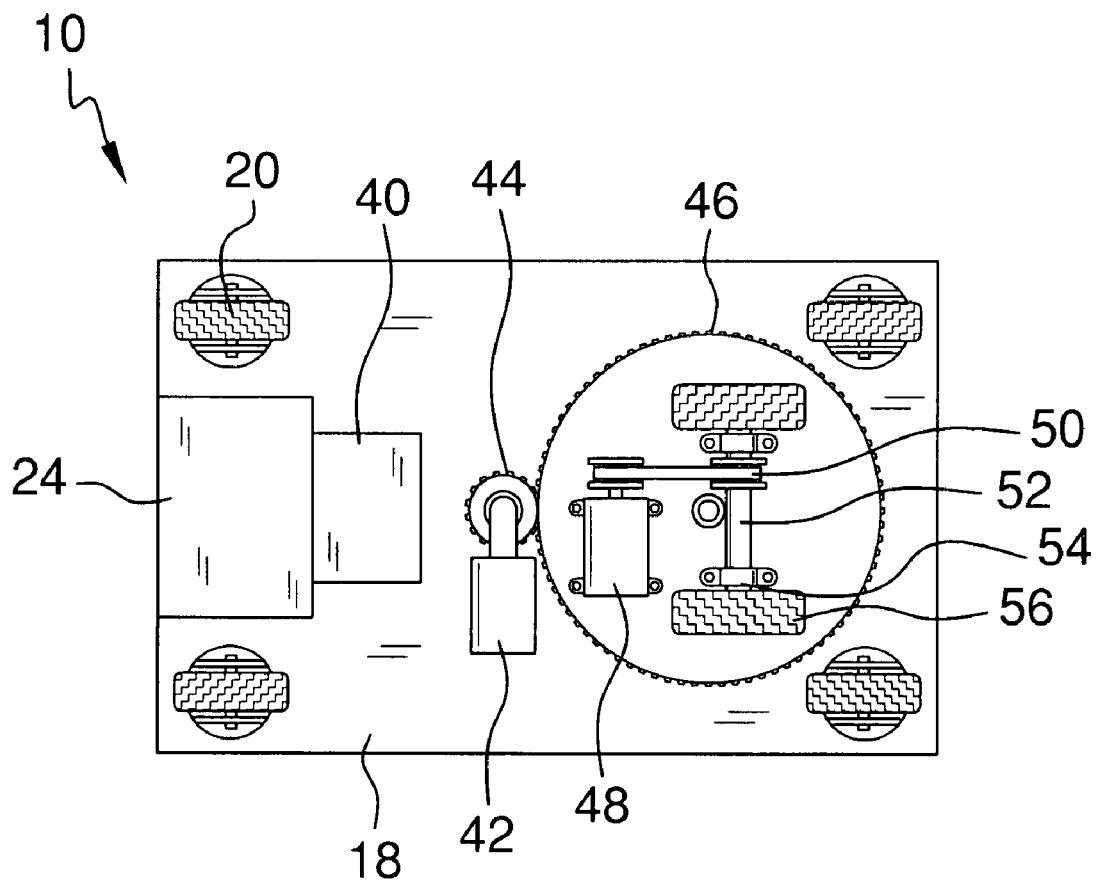
FIG. 3 is a bottom side view of the electric vehicle of the present invention.

Continuing with FIG. 3, a new and improved electric vehicle 10 of the present invention for providing shoppers with a motorized shopping cart that can be moved and steered via a hand controller is illustrated and will be described. More particularly, the electric vehicle 10 has a base 18 with wheels 20 attached to the corners of its underside. Battery 24, control box 40, right angle motor 42, drive motor 48, large turning gear 46, and driveshaft 52 are also attached to the bottom of base 18. Driveshaft 52 is connected to the large turning gear 46 by brackets 54. Right angle motor 42 drives small turning gear 44, which in turn drives large turning gear 46 to turn drive motor 48 and driveshaft 52 left and right. The left and right movements of driveshaft 52 in turn change the orientation of drive wheels 56 with respect to base 18 to turn electric vehicle 10 left and right. Drive motor 48 imparts rotational motion to driveshaft 52 via drive belt 50. This in turn causes drive wheels 56 to rotate, thereby moving electric vehicle 10 forward and backward. Input provided to control box 40 by controller 12 controls the flow of power from battery 24 to right angle motor 42 and drive motor 48, thereby controlling the speed and direction of electric vehicle 10.

Figure 4:
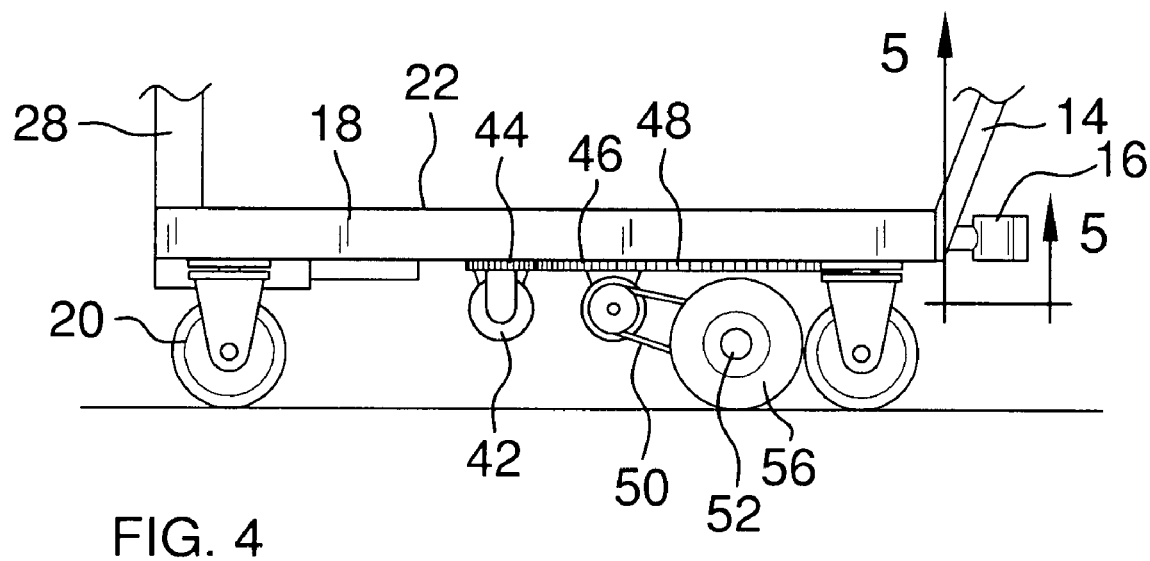
FIG. 4 is a side fragmentary view of the electric vehicle of the present invention.

In FIG. 4, a new and improved electric vehicle 10 of the present invention for providing shoppers with a motorized shopping cart that can be moved and steered via a hand controller is illustrated and will be described. More particularly, the electric vehicle 10 has a base 18 with pressure sensor 22 attached to its top and wheels 20, right angle motor 42, large turning gear 46, drive motor 48, and driveshaft 52 attached to its bottom. Right angle motor 42 turns small turning gear 44, which in turn turns large turning gear 46. Drive motor 48 turns drive wheels 56 by imparting rotational motion to driveshaft 52 via drive belt 50. Clip 16, front rail 14, and rear support 28 are also visible.

Figure 5:
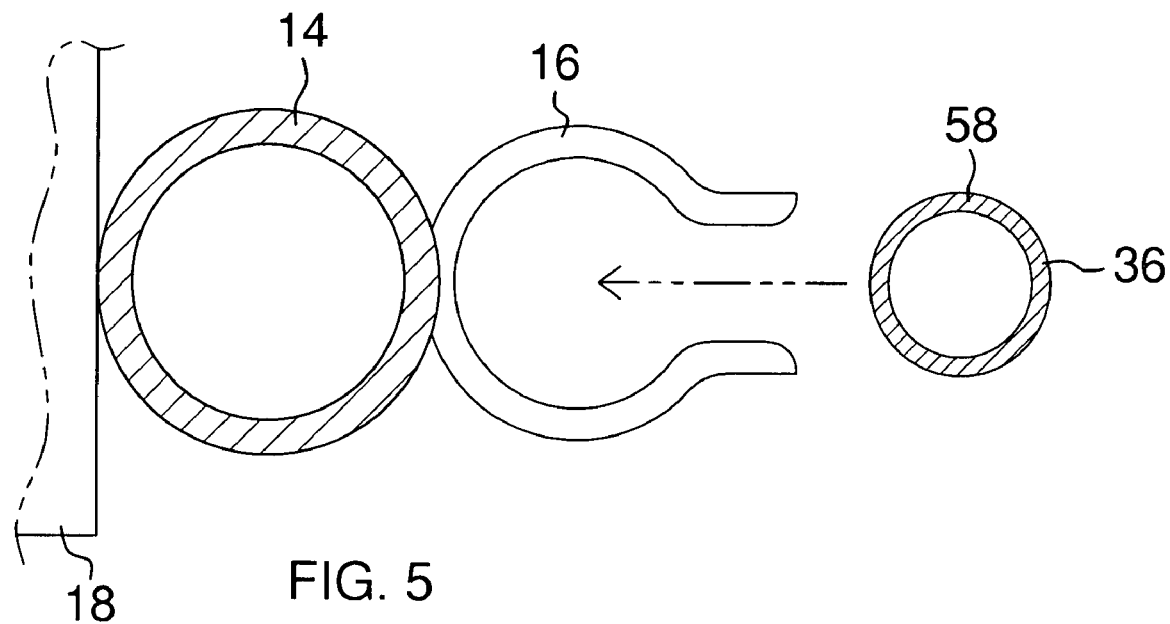
FIG. 5 is a top side sectional view of the clip of the present invention.

Furthermore, in FIG. 5, a new and improved clip 16 of the present invention for providing shoppers with a motorized shopping cart that can be moved and steered via a hand controller is illustrated and will be described. More particularly, the clip 16 protrudes outwardly from the front of base 18. Clip 16 releasably receives rear leg 58 of shopping cart 36 to attach shopping cart 36 to electric vehicle 10. Front rail 14 is also shown.

Figure 6:
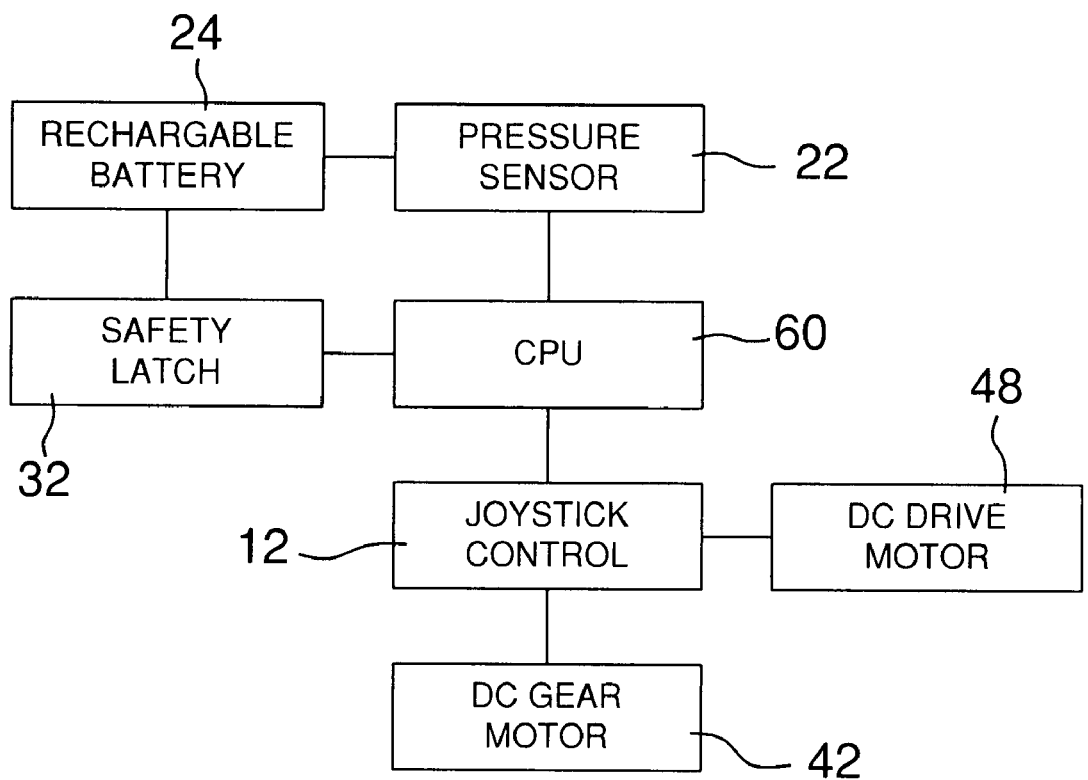
FIG. 6 is a schematic view of the electric vehicle of the present invention. The same reference numerals refer to the same parts throughout the various figures.

Concluding with FIG. 6, a new and improved electric vehicle 10 of the present invention for providing shoppers with a motorized shopping cart that can be moved and steered via a hand controller is illustrated and will be described. More particularly, the electric vehicle 10 has a rechargeable battery 24 that powers CPU 60, pressure sensor 22, safety latch 32, right angle motor 42, drive motor 48, and controller 12. Pressure sensor 22 measures the weight of the user and unlocks controller 12 only when the measured weight exceeds a predetermined minimum, thereby ensuring that a small child cannot activate electric vehicle 10. Similarly, side rails 34 must be inserted into rear rails 30 and safety latches 32 must be closed before controller 12 is unlocked. When controller 12 is unlocked, the user can issue commands to right angle motor 42 and drive motor 48 to control the speed and direction of electric vehicle 10 via CPU 60. In the current embodiment, right angle motor 42 and drive motor 48 are DC-type motors.

In use, it can now be understood that the user attaches shopping cart 36 to electric vehicle 10 by inserting rear legs 38 into clip 16. The user then stands on base 18 and inserts side rails 34 into rear rails 30 and secures latches 32. If the would-be user is of a sufficient weight as detected by pressure sensor 22 to exceed the preset minimum, controller 12 is unlocked. The user can then use controller 12 to move and steer the electric vehicle 10 with attached shopping cart 36 within a store. When the user unlocks side rails 34 from rear rails 30, or steps off pressure sensor 22, electric vehicle 10 is rendered immobile.

While a current embodiment of the electric vehicle has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable controller may be used instead of the joystick-type controller described. Also, the pressure sensor may be replaced with or augmented by additional childproofing measures. And although providing shoppers with a motorized shopping cart that can be moved and steered via a hand controller has been described, it should be appreciated that the electric vehicle herein described is also suitable for use for transportation and/or for moving other objects. Furthermore, a wide variety of power sources may be used instead of the rechargeable battery described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. In combination with a shopping cart, including a plurality of rear legs, the improvement which comprises:
    a plurality of clips removably connected to said rear legs of said shopping cart;
    a base having a top, a bottom, a front, a middle, and a rear, wherein said front is attached to said plurality of clips;
    a plurality of wheels attached to said front and said rear of said bottom of said base;
    a power source attached to said rear of said bottom of said base;
    a control box attached to said rear of said bottom of said base;
    a CPU enclosed by said control box;
    a right angle motor attached to said middle of said bottom of said base;
    a small turning gear connected to said right angle motor;
    a large turning gear frictionally engaged with said small turning gear;
    a drive motor attached to said large turning gear;
    a driveshaft having opposing ends and a middle attached to said large turning gear by a plurality of brackets;
    a drive belt having opposing ends with one end connected to said drive motor and said opposing end connected to said middle of said driveshaft;
    a plurality of drive wheels connected to said opposing ends of said driveshaft;
    a plurality of front rails having opposing ends with one end attached to said front of said base;
    a plurality of side rails having opposing ends with one of said opposing ends telescopically protruding from said front rails;

a plurality of rear rails having opposing ends with one end releasably receiving one of said opposing ends of said side rails opposite said front rails; and a rear support having opposing ends and a middle with one end attached to said top of said rear of said base and said opposing end attached to one of said opposing ends of said rear rails, opposite said side rails; and a controller suspended between said front rails.

* * * * *